United States Patent Office 3,354,235
Patented Nov. 21, 1967

3,354,235
OLEFIN POLYMERIZATION WITH A SUPPORTED NICKEL OXIDE CATALYST AND AN ORGANO-METAL COMPOUND
John P. Hogan and Alonzo G. Kitchen, Bartlesville, Okla., assignors to Phillips Petroleum Company, a corporation of Delaware
No Drawing. Filed Oct. 28, 1963, Ser. No. 319,549
7 Claims. (Cl. 260—683.15)

This invention relates to olefin polymerization. In one aspect the invention relates to the polymerization of mono-olefins to low molecular weight polymers. In yet another aspect the invention relates to the polymerization of mono-1-olefins having 2 to 5 carbon atoms per molecule to higher molecular weight olefins. Still another aspect of the invention relates to a catalyst system useful for the polymerization of mono-olefins to low molecular weight polymers.

The polymerization of mono-olefins, particularly mono-1-olefins, with nickel oxide supported on a support such as silica-alumina, alumina, silica, kieselguhr, activated clay, charcoal, and the like, has been disclosed, for example in patents to G. C. Bailey and J. A. Reid U.S. 2,381,198 and 2,581, 228. In general the supported nickel oxide catalysts are useful for polymerization of $C_2$ to $C_5$ mono-olefins such as ethylene, propylene, 1-butene, 2-butene, isobutylene, 1-pentene, and the like, and combinations thereof. The mono-1-olefins are preferred. In general the products of this catalyzed polymerization are dimers, trimers, tetramers, or the like, of the starting olefin.

It is an object of the invention to provide a novel catalyst system for the polymerization of mono-olefins to low molecular weight polymers.

Yet another object of the invention is to provide a method for the polymerization of mono-olefins to low molecular weight polymers.

Yet another object of the invention is to provide a method for increasing the conversion of mono-olefins to low molecular weight polymers employing a supported nickel oxide catalyst.

These and other objects of the invention will be readily apparent to those skilled in the art from the accompanying disclosure and appended claims.

These objects are broadly accomplished by employing a polymerization catalyst system prepared by admixing (a) nickel oxide supported on silica, alumina or silica-alumina and (b) an organometal compound having the formula $MR_n$ where M is selected from the group consisting of aluminum, boron, zinc, gallium, cadmium, lithium, tin, indium and thallium, and R is selected from the group consisting of hydrogen, and alkyl, cycloalkyl and aryl groups and combinations of these hydrocarbon radicals having from 1 to 20 carbon atoms, inclusive, wherein at least one R group is a hydrocarbon radicaly, and $n$ is equal to the valence of the metal M.

It has now been found that if an organometal is added to the supported nickel oxide catalyst of the prior art an increase in the yield of product from the same weight nickel oxide catalyst can be obtained.

A number of methods have been proposed in the art for the preparation of the supported nickel oxide-type catalyst. The solid metal oxide catalyst composites may be prepared by any conventional method known in the art such as impregnation, dry mixing, coprecipitation and the like. One suitable method is the impregnation technique wherein a solution of a soluble metal salt, which yields the oxide on calcination, is contacted with the particulate support followed by drying to remove the solvent. For example, an aqueous solution of a nickel salt, such as nickel nitrate or nickel acetate, is slurried with a high-purity, finely-divided silica and the wet composite is then dried to remove the bulk water. The impregnated support may be pressed into shape such as pills, saddles, cylinders, and the like, if desired, or it may be utilized in a particulate condition which is suitable for suspended catalyst polymerization. Impregnation of some supports sometimes causes caking after drying and the caked material may be crushed to any size desirable, for example 10 to 200 mesh (U.S. sieve series) particles.

Generally, the nickel oxide content of these catalysts is in the range of 0.1 to about 35 weight percent and preferably in the range of 1 to 10 weight percent (calculated as the metal though present as the oxide) based on the supported nickel oxide catalyst.

The supported nickel oxide catalyst is activated at elevated temperatures prior to use. Exposures to temperature of about 850 to about 1600° F. for periods of about 0.1 to about 50 hours is generally sufficient. Shorter activation times are used with the higher activation temperatures and vice versa. With the more durable catalyst supports such as high purity silicas, activation temperatures of up to about 2000° F. are feasible. The optimum activation temperature has been found to be generally in the range of about 1000 to about 1600 and preferably from about 1200 to about 1400° F. The activation is generally carried out in the presence of an oxygen-containing gas such as air. An inert gas such as nitrogen may also be used provided the ultimate nickel species obtained is in the oxide form. The catalyst after the activation may also be treated, if desired, with other gases such as nitrogen, hydrogen, carbon monoxide, carbon dioxide and the like. After activation the catalyst is cooled and stored in an inert atmosphere and particularly protected from contact with water vapor.

The polymerization of the mono-olefin is effected in a polymerization zone under polymerization conditions which may vary within a wide range but in general is not much less than about 70° F. and not appreciably above about 500° F., preferably 100 to 300° F. The reaction may be carried out under a wide range of pressures from as low as atmospheric or may be varied to as high as 2000 p.s.i. or above, preferably 0 to 1500 p.s.i.g. Although the polymerization reaction may be carried out in either liquid or gaseous phase, it is preferred to use liquid phase conditions and therefore a pressure is employed which insures substantial or complete liquid phase operation. Liquid phase operation facilitates controlled reaction temperature and contributes to catalyst life by diminishing the deposition of high molecular weight, or other nonvolatile or insoluble materials, in the catalyst surface. The liquid hourly space velocity in a fixed catalyst bed operation, for example, may be as high as about 20 but up to about 10 volumes of liquid per volume of reactor space per hour is preferred.

It has now been found that the presence of a small amount of an organometal compound in the reaction zone provides a surprisingly large increase in the total yield of low molecular weight polymerization product.

Examples of organometal compounds which are employable are triethylaluminum, trimethylboron, diethylzinc, dibutylcadmium, triisobutylgallium, tricyclopentylindium, triphenylthallium, tridecylgallium, di(3,4-dihexylcyclopentyl)cadmium, tri(3,4,5-tributylcyclohexyl)aluminum, di(2,6-diethyl-4-decylbenzyl)zinc, diisopropylzinc, triphenylboron, diethylaluminum hydride, tetra(14-phenyltetradecyl)tin, 2-butylcyclohexyllithium, tri(4-cyclohexyloctyl)gallium, tri(3 - methyloctyl)gallium, trimethylthallium, and the like. Particularly preferred are the organoaluminum compounds, more preferably the trialkylaluminum compounds.

The amount of the organometal employed in conjunction wtih the supported nickel oxide catalyst is generally in the range from about 0.01 to about 30 weight percent based on the weight of the nickel containing solid catalyst component and is preferably from about 0.1 to 15 weight percent. The optimum amount within this range to be employed in a particular polymerization system depends to some extent at least upon the reaction conditions used, the specific characteristics of the catalyst and the specific olefins undergoing polymerization. The optimum amount can readily be determined by mere routine test upon the consideration of this disclosure.

In general the polymerization of the olefins will effect dimerization, trimerization, and tetramerization of the starting olefin. For example, when ethylene is the starting olefin the products will comprise substantial amounts of olefins containing 4, 6, 8 and 10 carbon atoms and small amounts of olefins containing 12 and more carbon atoms.

If desired the polymerization reaction can take place in the presence of an inert diluent. As is well known to those skilled in the art, cyclohexane, normal pentane, or other paraffinic hydrocarbons are suitable.

The organometal compounds utilized in accordance with this invention may be added to the reaction zone at any time, but is preferably supplied to the reaction zone as a stream separate from the supported nickel oxide catalyst either on continuous or batch operation. For example, the organometal compound can be premixed with the solid nickel oxide catalyst; however, it is preferred that the organometal compound not be permitted to remain in contact with the metal oxide catalyst in the absence of the active monomer for more than a few minutes, preferably less than 5 minutes. Preferably the organometal is added to the reactor in the presence of a diluent. The solid nickel oxide portion of the catalyst and monomer are then added separately with or without additional diluent.

It is generally desired that the reagents and diluent be substantially anhydrous and free from catalyst poisons. When small amounts of moisture or other catalyst poisons are not removed prior to the polymerization the amount of organometal compound used should be increased to take into account the amount of such compound decomposed by impurities such as water and to provide sufficient amount to enhance the activity of the nickel oxide catalyst after any moisture or other impurity present has been completely reacted with the organometal compound.

After reaction the polymerized material can be recovered by any conventional means and solvent removed. A preservative, such as anti-oxidant, can also be added to the polymer.

The invention can be further illustrated by the following examples.

EXAMPLE I

Several ethylene polymerizations were carried out in a 1-liter stirred reactor which contained 0.60 pound of n-pentane diluent. The runs were one hour in length and were carried out at 210° F. and 470 p.s.i.g.

In Run 1, a nickel oxide catalyst supported on silica-alumina was used. It was prepared by impregnating a catalytic grade silica-alumina (containing about 87 weight percent silica and 13 weight percent alumina) with sufficient nickel compound to yield a solid catalyst containing about 2.7 weight percent nickel (calculated as the metal, but present as the oxide) upon subsequent drying and calcination. This calcination (activation) was carried out for five hours at 1000° F. in the presence of flowing air.

In Run 2, the above-described nickel oxide catalyst was promoted by a fluoriding treatment for comparison. The fluoriding treatment was carried out by mixing an aqueous solution of 1.2 gm. of ammonium silicofluoride with 34.3 gm. of the above-described catalyst before the drying and activation treatment.

In Run 3, showing the invention process, a quantity of triethylaluminum, which was 10 weight percent based upon the weight of the solid catalyst, was separately added to the reactor shortly before the ethylene was admitted. A 5.0 cc. quantity of a cyclohexane solution of triethylaluminum, which contained 0.02 gm. of triethylaluminum per 1 cc. of solution, was added to the reactor after 1.02 gm. of the nickel oxide catalyst and the diluent were charged.

The following table shows the results of these three runs. In each case the solid catalyst was activated for five hours at 1000° F. in air and contained 2.7 weight percent nickel.

TABLE

| Run No. | 1 | 2 | 3 |
|---|---|---|---|
| Catalyst, gm. | 1.06 | 1.10 | 1.02 |
| Product, gm. | 118 | 139 | 222 |
| Yield, gm./gm. | 110 | 130 | 220 |
| Product, Wt. percent of total product: | | | |
| 1-butene | 39.8 | 36.9 | 22.5 |
| Trans-2-butene | 19.2 | 20.1 | 22.9 |
| Cis-2-butene | 15.6 | 13.3 | 13.9 |
| $C_6$ | 19.3 | 21.4 | 26.0 |
| $C_8$ | 4.3 | 5.1 | 10.6 |
| $C_{10}$ | 1.8 | 3.2 | 4.1 |
| $C_{12}$ | Trace | Trace | Trace |

The data in the preceding table clearly show that the fluoriding treatment of the nickel catalyst produces a relatively small increase in the productivity of the system. The use of the organometal compound, on the other hand, results in a large increase in productivity. In fact, the quantity of low molecular weight polymers per unit weight catalyst is doubled.

While certain examples, structures, composition and process steps have been described for purposes of illustration the invention is not limited to these. Variation and modification within the scope of the disclosure and the claims can readily be effected by those skilled in the art.

We claim:

1. A catalyst useful for the polymerization of mono-olefins having 2 to 5 carbon atoms per molecule to low molecular weight polymers prepared by admixing components consisting essentially of (a) nickel oxide supported on a porous particulate support selected from the group consisting of silica, alumina, and silica-alumina, and (b) an organometal compound having the formula $MR_n$ wherein M is selected from the group consisting of aluminum, boron, zinc, gallium, cadmium, lithium, tin, indium, and thallium, R is selected from the group consisting of hydrogen, alkyl, cycloalkyl, and aryl groups and combinations thereof having a total of 1 to 20 carbon atoms per molecule wherein at least one R group is a hydrocarbon radical, and $n$ is equal to the valence of the metal M.

2. A catalyst useful for the polymerization of mono-1-olefins having from 2 to 5 carbon atoms per molecule to low molecular weight polymers prepared by admixing components consisting essentially of (a) from about 99.99 to about 70 weight percent based on total catalyst of a nickel oxide supported on a porous particulate support selected from the group consisting of silica, alumina, and silica-alumina and containing about 0.1 to about 35 weight percent of nickel-oxide based on the total of (a), and (b) from about 0.01 to about 30 weight percent based on total catalyst of an organometal compound having the formula $MR_n$ wherein M is selected from the group consisting of aluminum, boron, zinc, gallium, cadmium, lithium, tin, indium and thallium, R is selected from the group consisting of hydrogen, alkyl, cycloalkyl and aryl groups and combinations thereof having a total of 1 to 20 carbon atoms per molecule wherein at least one R group is a hydrocarbon radical, and $n$ is equal to the valence of the metal M.

3. A catalyst useful for the polymerization of ethylene to low molecular weight alpha olefins having from 4 to 12 carbon atoms per molecule, inclusive, and prepared by admixing components consisting essentially of (a) from about 99.9 to about 85 weight percent based on total catalyst of nickel oxide supported on silica-alumina containing from about 1 to about 10 weight percent based on total of (a) nickel oxide, and (b) from about 0.1 to about 15 weight percent of triethylaluminum based on total catalyst.

4. A process for polymerizing a mono-olefin to a low molecular weight polymer comprising contacting said mono-olefin under polymerization conditions in the presence of a catalyst prepared by admixing components consisting essentially of (a) a nickel oxide supported on a porous particulate support selected from the group consisting of silica, alumina, and silica-alumina, and (b) an organometal compound having the formula $MR_n$ wherein M is selected from the group consisting of aluminum, boron, zinc, gallium, cadmium, lithium, tin, indium, and thallium, R is selected from the group consisting of hydrogen, alkyl, cycloalkyl and aryl groups and combinations thereof having a total of 1 to 20 carbon atoms per molecule wherein at least one R group is a hydrocarbon radical, and $n$ is equal to the valence of the metal M.

5. A process for polymerizing a mono-1-olefin having from 2 to 5 carbon atoms per molecule to low molecular weight polymers comprising contacting said mono-1-olefin under polymerization conditions with a catalyst prepared by admixing components consisting essentially of (a) from about 99.9 to about 70 weight percent based on total catalyst of nickel oxide supported on a porous particulate support selected from the group consisting of silica, alumina, and silica-alumina and containing about 0.1 to about 35 weight percent of nickel oxide based on the total of (a), and (b) from about 0.01 to about 30 weight percent based on total catalyst of an organometal compound having the formula $MR_n$ wherein M is selected from the group consisting of aluminum, boron, zinc, gallium, cadmium, lithium, tin, indium and thallium, R is selected from the group consisting of hydrogen, alkyl, cycloalkyl and aryl groups and combinations thereof having a total of 1 to 20 carbon atoms per molecule wherein at least one R group is a hydrocarbon radical, and $n$ is equal to the valence of the metal M.

6. A process for polymerizing ethylene to low molecular weight olefins having from 4 to 12 carbon atoms per molecule, inclusive, comprising contacting said ethylene in the presence of a hydrocarbon diluent in a polymerization zone maintained at a temperature in the range of 70 to 500° F. and 0 to 1500 p.s.i.g. with a catalyst prepared by admixing components consisting essentially of (a) from about 99.9 to about 85 weight percent based on total catalyst of nickel oxide supported on silica-alumina containing from about 1 to about 10 weight percent of nickel oxide based on total of (a), and (b) from about 0.1 to about 15 weight percent of triethylaluminum based on total catalyst.

7. A process for polymerizing a mono-1-olefin having from 2 to 5 carbon atoms per molecule to low molecular weight polymers comprising introducing into a polymerization zone maintained at polymerization conditions and containing a hydrocarbon diluent a nickel oxide catalyst supported on a porous particulate support selected from the group consisting of silica, alumina and silica-alumina, then introducing into said zone an organometal compound having the formula $MR_n$ wherein M is selected from the group consisting of aluminum, boron, zinc, gallium, cadmium, lithium, tin, indium, and thallium, R is selected from the group consisting of hydrogen, alkyl, cycloalkyl and aryl groups and combinations thereof having a total of 1 to 20 carbon atoms per molecule wherein at least one R group is a hydrocarbon radical and $n$ is equal to the valence of the metal M, and thereafter introducing into said zone said mono-1-olefin.

References Cited
UNITED STATES PATENTS

| | | | |
|---|---|---|---|
| 2,470,166 | 5/1949 | Hetzel et al. | 260—683.15 |
| 2,581,228 | 1/1952 | Bailey et al. | 252—455 |
| 2,824,089 | 2/1958 | Peters et al. | 260—683.15 X |
| 2,892,286 | 6/1959 | Peters et al. | 260—93.7 |
| 3,035,104 | 5/1962 | Harvey et al. | 260—683.15 |
| 3,096,385 | 7/1963 | McConnell et al. | 260—683.15 |
| 3,105,066 | 9/1963 | MacKenzie | 260—93.7 |
| 3,170,906 | 2/1965 | Ueda et al. | 252—430 X |
| 3,196,137 | 7/1965 | Cain | 260—93.7 |
| 3,215,682 | 11/1965 | Farrar et al. | 260—683.15 X |

PAUL M. COUGHLAN, Jr., *Primary Examiner.*

DELBERT E. GANTZ, *Examiner.*

R. H. SHUBERT, *Assistant Examiner.*